United States Patent
McCarry

(10) Patent No.: US 10,909,209 B2
(45) Date of Patent: Feb. 2, 2021

(54) DYNAMIC INSERTION OF CONTENT INTO WEBPAGES

(71) Applicant: Oracle International Corporation, Redwood Shores, CA (US)

(72) Inventor: Frank McCarry, Ballycastle (GB)

(73) Assignee: Oracle International Corporation, Redwood Shores, CA (US)

( * ) Notice: Subject to any disclaimer, the term of this patent is extended or adjusted under 35 U.S.C. 154(b) by 79 days.

(21) Appl. No.: 15/010,504

(22) Filed: Jan. 29, 2016

(65) Prior Publication Data

US 2017/0220533 A1    Aug. 3, 2017

(51) Int. Cl.
*G06F 16/93* (2019.01)
*G06F 16/957* (2019.01)
*G06F 16/958* (2019.01)

(52) U.S. Cl.
CPC ........ *G06F 16/9577* (2019.01); *G06F 16/972* (2019.01)

(58) Field of Classification Search
CPC ............. G06F 17/2205; G06F 17/2247; G06F 17/2288; G06F 16/9577; G06F 16/972
See application file for complete search history.

(56) References Cited

U.S. PATENT DOCUMENTS

| | | |
|---|---|---|
| 6,115,718 A | 9/2000 | Huberman et al. |
| 6,408,290 B1 | 6/2002 | Thiesson et al. |
| 6,430,305 B1 | 8/2002 | Decker |
| 6,496,816 B1 | 12/2002 | Thiesson et al. |
| 6,529,891 B1 | 3/2003 | Heckerman |
| 6,553,352 B2 | 4/2003 | Delurgio et al. |
| 6,779,119 B1 | 8/2004 | Moshfeghi et al. |
| 6,801,909 B2 | 10/2004 | Delgado et al. |
| 6,836,773 B2 | 12/2004 | Tamayo et al. |
| 6,895,398 B2 | 5/2005 | Evans-Beauchamp et al. |
| 7,113,917 B2 | 9/2006 | Jacobi et al. |
| 7,328,201 B2 | 2/2008 | D'Ambrosio |
| 7,421,458 B1 * | 9/2008 | Taylor ............... G06F 17/30607 |
| 7,499,948 B2 | 3/2009 | Smith et al. |
| 7,870,084 B2 | 1/2011 | D'Ambrosio |

(Continued)

OTHER PUBLICATIONS eStara, "Rules-Based Triggers FAQ" Copyright 2007.

(Continued)

*Primary Examiner* — Stephen S Hong
*Assistant Examiner* — Hope C Sheffield
(74) *Attorney, Agent, or Firm* — Potomac Law Group, PLLC

(57) ABSTRACT

Systems and methods for manipulating dynamically rendered content are described herein. A plurality of rules are defined and stored, wherein each rule includes a condition and an action, and wherein each action includes an instruction to render content within a webpage. A rule object is generated based on the plurality of rules, wherein the rule object includes executable code. The rule object is stored within an in-memory device disposed between a rules server and a transformation server. A request is received from a browser engine contained within the webpage. The rule object is executed to generate data based on the request; and the data generated by the rule object is transmitted to the browser engine contained within the webpage.

21 Claims, 5 Drawing Sheets

(56) References Cited

U.S. PATENT DOCUMENTS

| | | | |
|---|---|---|---|
| 8,977,653 B1* | 3/2015 | Mahkovec | G06F 17/30899 707/769 |
| 2001/0014868 A1 | 8/2001 | Herz et al. | |
| 2001/0021914 A1 | 9/2001 | Jacobi et al. | |
| 2002/0062245 A1 | 5/2002 | Niu et al. | |
| 2005/0209903 A1 | 9/2005 | Hunter et al. | |
| 2006/0179421 A1 | 8/2006 | Bielski et al. | |
| 2007/0233902 A1 | 10/2007 | Trefler et al. | |
| 2008/0208785 A1 | 8/2008 | Trefler et al. | |
| 2009/0125469 A1* | 5/2009 | McDonald | G06F 17/30864 706/47 |
| 2009/0132232 A1 | 5/2009 | Trefler | |
| 2009/0240531 A1 | 9/2009 | Hilborn | |
| 2010/0125762 A1 | 5/2010 | Nie et al. | |
| 2011/0055683 A1* | 3/2011 | Jiang | G06F 17/30899 715/234 |
| 2011/0137832 A1 | 6/2011 | D'Ambrosio | |
| 2012/0030166 A1* | 2/2012 | Mohr | G06F 9/542 707/610 |
| 2012/0290974 A1 | 11/2012 | Doig et al. | |
| 2013/0080874 A1* | 3/2013 | Coleman | G06F 17/30893 715/234 |
| 2013/0262443 A1* | 10/2013 | Leida | G06F 17/30427 707/722 |
| 2015/0149985 A1* | 5/2015 | Foebel | H04L 43/10 717/131 |
| 2017/0116135 A1* | 4/2017 | Sundaravaradan | G06F 12/0842 |

OTHER PUBLICATIONS

LivePerson, "LiveAlerts," http://solutions.liveperson.com/help/livealert.asp (last visited Aug. 22, 2011).

LivePerson, "Creating Rules to Automatically Capture Visit Information," http://base.liveperson.net/hc/s-5296924/cmd/kbresource/kb-6343261275199944167/view_question!PAGETYPE?sc=4582&sf=101133&documentid=397902&action=view (last visited Aug. 22, 2011).

Akamai, "Advanced Cache Control," http://www.akamai.com/dl/featuere_sheets/fs_edgesuite_adv_cachecontrol.pdf last visited Aug. 22, 2011).

University of Pennsylvania, "Caching Description," http://www.upenn.edu/computing/web/central-host/caching/caching-description.html (last visited Aug. 22, 2011).

Greenspan, H., et al., "Learning Texture Discrimination Rules in a Multiresolution System," IEEE Transactions on Pattern Analysis and Machine Intelligence, vol. 16, No. 9, pp. 894-901, Sep. 1994.

D'Ambrosio B. et al., "Probabilistic Relational Models of On-line User Behavior: Early Explorations," Proceedings of the Fifth WEBKDD workshop; Webmining as a Premise to Effective and Intelligent Web Applications (WEBKDD'2003), in conjunction with ACM SIGKDD conference, Washington, DC, USA Aug. 27, 2003, pp. 9-16.

* cited by examiner

DYNAMIC INSERTION OF CONTENT INTO WEBPAGES

FIELD

The embodiments of the present invention generally relate to techniques for controlling webpage content and, more particularly, to dynamically assembled webpages.

BACKGROUND

As Internet commerce continues to expand, websites continue to display increasing amounts of information and grow in complexity. In addition, websites may be assembled from multiple backend data sources. Unaware of the backend data sources, the end-user typically navigates within a web browser to a variety of webpages, each webpage including content that can be displayed within the browser. The content is generally controlled and rendered by the website owner. In some instances, the webpage may be linked to content generated by a third-party provider. For example, the webpage can include an advertisement banner of a website owned by the third-party provider. Thus, the webpage can cause content to be displayed within the browser that is generated by the third-party provider, in addition to content that is generated by the website owner.

The third-party content may be statically or dynamically generated content. For example, the third-party content may include content that is determined based on an end user profile, the type of browser utilized by the end user, how many times the end user has navigated to the current webpage, or which webpages of the website the end-user has viewed. If the third-party content is dynamic, the webpage may not actually include the third-party content, but rather may include a reference to a system of the third-party provider that is responsible for determining which third-party content to display within the browser and providing the third-party content to the webpage. The third-party provider's system then determines which third-party content to display within the website, and to upload the third-party content to the website to be displayed within the browser. Determining which third-party content to display can involve one or more queries to a database located within the third-party provider's system.

During the rendering of websites, efficient information retrieval from backend databases remains an increasingly challenging problem, and such queries to the database can be expensive in terms of processing time. As a result, such queries can significantly increase the overall time required to display content within the webpage displayed within the end-user's browser. In addition, if the third-party content that is generated for the website is dynamic, the third-party content can be different each time the end-user navigates to the webpage, and thus, the dynamic third-party content can prevent caching of the webpage by the browser.

SUMMARY

The embodiments of the present invention are generally directed to systems and methods for manipulation of third party content in dynamically assembled webpages that substantially improve upon the related art.

Features and advantages of the embodiments are set forth in the description which follows, or will be apparent from the description, or may be learned by practice of the invention.

For example, the embodiments are generally directed toward systems and methods for manipulating dynamically rendered content are described herein. A plurality of rules are defined and stored, wherein each rule includes a condition and an action, and wherein each action includes an instruction to render content within a webpage. A rule object is generated based on the plurality of rules, wherein the rule object includes executable code. The rule object is stored within an in-memory device disposed between a rules server and a transformation server. A request is received from a browser engine contained within the webpage. The rule object is executed to generate data based on the request; and the data generated by the rule object is transmitted to the browser engine contained within the webpage.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
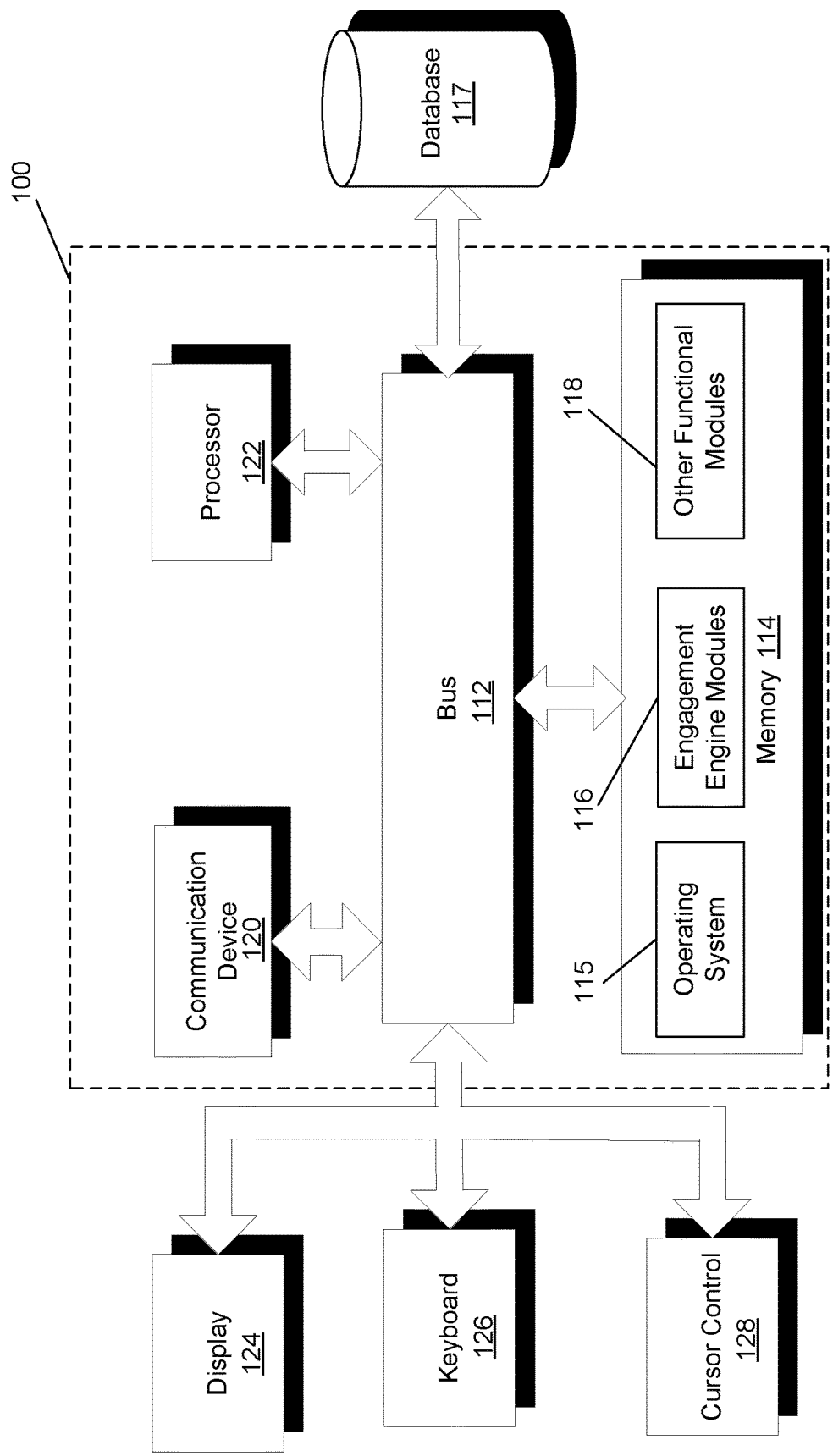
FIG. 1 illustrates a block diagram of a rules system according to an example embodiment of the invention.

The embodiments generally provide services that dynamically add, modify, and/or or remove content on webpages. Use of an in-memory configuration described herein achieves significant performance and functional benefits over known solutions. According to the various embodiments, a collection of rules can be generated by a user and stored within a data store. The collection of rules can be, for example, a collection of rules that dynamically control content displayed within a webpage. From this collection of rules, a subset of rules can be deployed based on a filter. Each of the selected rules may be read from the data store and transformed into rule objects. The rule objects can each be retrieved by a rules server from an in-memory device disposed between the rules server and a transformation server. In addition, a request is received from a browser engine contained within the webpage. The rule objects are executed to generate data based on the request; and the data generated by the rule objects are transmitted to the browser engine contained within the webpage. The browser can utilize the data to display dynamic content to the end-user, so that the dynamic content is rendered within the webpage.

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse.

The electronic device may support a variety of applications, such as Internet browser, text messenger, experience management, and various other applications. The various applications that may be executed on the electronic device may use at least one common physical user-interface device. In addition, a common physical architecture of the electronic device may support a variety of applications with user interfaces that are intuitive and transparent. In the discussion that follows, the engagement engine modules are used as an example embodiment, but it should be understood that the user interfaces and associated methods of the engagement engine modules may be readily applied to other applications.

FIG. 1 is a block diagram of a computer server/system 100 in accordance with an example embodiment of the present invention.

As shown in FIG. 1, rules system 100 may include a bus device 112 and/or other communication mechanism(s) configured to communicate information between the various components of rules system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of rules system 100. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, manifest and engagement engine modules 116, and other applications 118, stored within memory 114.

Rules system 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for rules system 100. The modules can include an operating system 115, engagement engine modules 116 configured to control rule script execution, as well as other functional modules 118. Operating system 115 provides operating system functionality for rules system 100. Engagement engine modules 116 may include one or more application program interfaces ("API") that enable users to monitor the end-user and dynamically add, modify, and/or remove content on webpages, especially third party content. In some instances, engagement engine modules 116 may be implemented as an in-memory configuration that is used to generate and execute rule scripts that control content displayed within a webpage, as will be described in more detail below.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Although shown as a single system, the functionality of rules system 100 may be implemented as a distributed system. For example, memory 114 and processor 122 may be distributed across multiple different computers that collectively comprise rules system 100. In one embodiment, rules system 100 may be part of a device (e.g., smartphone, tablet, computer, etc.), and rules system 100 may provide manipulation of dynamically render content of webpages. In another embodiment, rules system 100 may be separate from the device, and may remotely provide the aforementioned functionality for the device.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with rules system 100.

Rules system 100 can be part of a larger system. Therefore, rules system 100 can include one or more additional functional modules 118 to include the additional functionality. A database 117 is coupled to bus 112 to provide centralized storage for modules 116 and 118 and to store user profiles, transactions history, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

Although illustrated as a single system, the functionality of rules system 100 may be implemented as a distributed system. Further, the functionality disclosed herein may be implemented on separate servers or devices that may be coupled together over a network. Further, one or more component of rules system 100 may not be included. For example, for functionality of a user client, rules system 100 may be a smartphone that includes a processor, memory and a display, but may not include one or more of the other components shown in FIG. 1.

Known systems for controlling webpage content have a number of drawbacks. For example, known systems require frequent reloading of rules scripts and updated rules scripts. As updates to rules scripts require several network components, their deployment is susceptible to database connection issues and network related problems, such as limited bandwidth. As a result, old rules scripts are frequent used instead of updated, but not yet available rules scripts.

Figure 2:
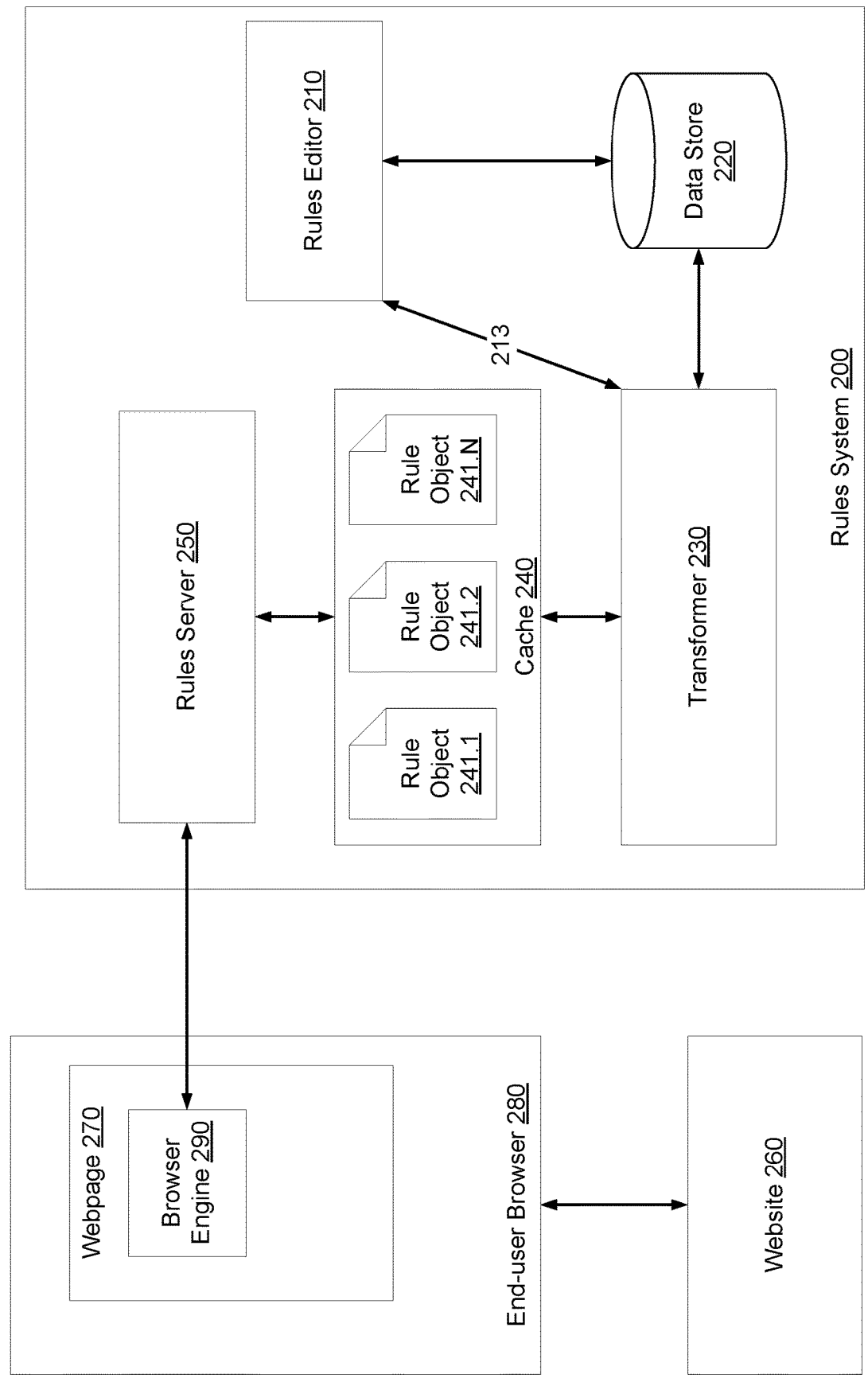
FIG. 2 illustrates a block diagram of a website operatively coupled to a rules system according to an example embodiment of the invention.

FIG. 2 illustrates a block diagram of a website operatively coupled to a rules system 200 according to an example embodiment of the invention.

As shown in FIG. 2, rules system 200 includes rules editor 210. Rules editor 210 is a web-based editor that enables a user of rules system 200 to define one or more rules. For example, rules editor 210 may display a user interface (e.g., a web browser, proprietary interface, and/or other interface) that enables the user to define one or more rules. Defining one or more rules may include generating, modifying, and/or deleting one or more rules, or any combination thereof. The defining of the rules rule may further include the determining of one or more conditions and/or one or more related actions for the rule. Actions that are associated with various rules may control the operation of webpages that are operatively coupled to rules system 200. For example, an action may control a display of content within webpages 270 operatively coupled to rules system 200. A condition is generally data that can be verified. Thus, a rule is a collection of one or more conditions, and/or one or more corresponding actions, where the rule can be composed by the user and stored in a tangible medium, such as data store 220.

Rules system 200 includes data store 220, and rules defined by rules editor 210 are stored within data store 220. Data store 220 can be any type of data storage device. For example, data store 220 can be a database (e.g., database 117), such as a relational database, and/or in-memory database. In another example, data store 220 can be a file, and/or a file system that includes a plurality of files. In some instances, the rules stored within data store 220 can be organized into one or more rule sets.

Rules stored within data store 220 are not immediately accessible by the other components of rule system 200. Instead, rules are deployed before becoming accessible by the other components of rules system 200. As described below in greater detail, the deployment of rules may include the transformation of the rules stored within data store 220 to rule objects 241.1-241.N stored within cache 240, such as an in-memory cache or in-memory data grid (e.g., "Coherence" from Oracle Corp.).

Rules system 200 also may include transformer 230. Rules editor 210 can transmit a deployment command 213 to transformer 230, where deployment command 213 includes instructions to deploy one or more rules retrieved from data store 220. In some instances, deployment command 213 may include a filter that can be applied to the rules stored within data store 220. For example, deployment command 213 can include instructions to deploy one or more rules associated with a specific website. In this example, the one or more rules associated with a specific website may be organized as a rule set.

Upon receiving deployment command 213, transformer 230 accesses data store 220 and retrieves one or more rules from data store 220 based on deployment command 213. According to an embodiment, deployment command 213 includes a filter, and transformer 230 can apply the filter to data store 220. More specifically, transformer 230 can filter the rules that are retrieved from data store 220 so that only the rules that satisfy the filter associated with deployment command 213 are returned.

Upon retrieving the rules from data store 220, transformer 230 generates one or more rule objects 241.1-241.N, such as rule scripts, based on the rules retrieved from data store 220. Rule objects 241.1-241.N are stored in cache 240. In one embodiment, transformer 230 may generate rule objects 241.1-241.N that correspond to each website that is operatively coupled to rules system 200. Here, each website may be defined using a request attribute, where the defined request attribute is stored within data store 220. In one embodiment, the request attribute is a Uniform Resource Locator ("URL") attribute.

The storage of rule objects 241.1-241.N within cache 240 enables rule publication in real-time or substantially real-time. As a result, rules server 250 does not require notification of a publish event. Instead, rules server 250 may retrieve, on-demand, the latest rule objects 241.1-241.N from data cache 240. Accordingly, the use of cache 240 ensures that rule objects 241.1-241.N are less error prone.

In some embodiments, transformer 230 generates rule objects 241.1-241.N by generating executable code for each rule selected from data store 220 and storing the executable code within a rule object. Thus, each rule object 241.1-241.N may include executable code. Transformer 230 can generate executable code in any of a variety of programming languages, such as Java®, JavaScript, C, C++, or Lua. The executable code may be pre-compiled, or compiled on the fly by compiler modules accessible by transformer 230.

In some embodiments, transformer 230 generates rule objects 241.1-241.N using synthetic variable rule scripts as described in U.S. Pat. No. 8,046,315, entitled "RELATIONAL BAYESIAN MODELING FOR ELECTRONIC COMMERCE," the contents of which are incorporated by reference herein. A synthetic variable scripting language is a scripting language for constructing synthetic variables, where a synthetic variable comprises a chain of elements (i.e., an expression), where an element comprises a set of selection phrases, and where each element serves as a mapping from input data to output data. The synthetic variables can be constructed based on a synthetic grammar. A synthetic variable scripting language can utilize extensible markup language ("XML") files to construct the synthetic variables, and the synthetic variable scripting language can be used to create synthetic variable rule scripts that have a highly optimized runtime. In order to modify a synthetic variable rule script, an XML file of a synthetic variable rule script can be modified.

Rules system 200 also includes rules server 250. Rules server 250 is configured to access rule objects 241.1-241.N within cache 240. Rules server 250 may retrieve rule objects 241.1-241.N according to a Hypertext Transfer Protocol ("HTTP") and/or other request mechanism. Rule objects 241.1-241.N become available once cache 240 is activated. Rules server 250 may rely upon cache 240 for storage and retrieval of rule objects 241.1-241.N. In addition, rules server 250 does not directly access data store 220 in order to load a rule script, such as those encapsulated within rule objects 241.1-241.N. As a result, rule objects 241.1-241.N may be rapidly executed by rules server 250. Furthermore, by generating executable code that comprises rule objects 241.1-241.N during deployment of the rule, rather than during runtime execution of the rule scripts, the processing time associated with rule objects 241.1-241.N can be greatly reduced. Accordingly, the overall performance of rules system 200 is improved relative to known solutions. In addition, as rule objects 241.1-241.N are stored within cache 240, they do not have to be held within rules server 250, further improving memory management for rules server 250. As rules server 250 retrieves rule objects 241.1-241.N from cache 240, rules server 250 publishes the most recent versions of rule objects 241.1-241.N.

Rules system 200 is operatively coupled to website 260 which is a collection of one or more webpages. Website 260 can receive a request from web browser 280, and can transmit the requested webpage to web browser 280 of the end user. In some instances, the request from the web browser may be an HTTP request. In the illustrated embodiment of FIG. 2, website 260 provides the content of webpage 270 within web browser 280. Webpage 270 is a webpage that is a part of website 260. Webpage 270 displays content based on rule objects 241.1-241.N of rules system 200.

End-user browser 280 is a web browser utilized by the end-user. End-user browser 280 is configured to render webpages, such as webpage 270. In one embodiment, end-user browser 280 can be Microsoft Internet Explorer®, Google Chrome®, Apple Safari®, or any other commercially available browser.

According to the various embodiments, webpage 270 includes a reference to rules system 200. For example, the reference to rules system 200 may be a JavaScript reference or a reference of another programming language. Regardless of the programming language used, the reference to rules system 200 includes an identifier that uniquely identifies website 260. As an example, the identifier may be an account number associated with website 260. However, in other examples, the identifier can be anything that uniquely identifies website 260, such as a sequence of numbers, a sequence of characters, or a combination therein.

End-user browser 280 subsequently transmits a request for browser engine 290. Browser engine 290 is a static scripting language file that contains executable code that can be executed by end-user browser 280. The executable code contained within browser engine 290 can control an operation of webpage 270. For example, the executable code contained within browser engine 290 can control a display of content within webpage 270. In one embodiment, browser engine 290 is a static JavaScript file. However, in alternate embodiments, browser engine can be a static file written in any scripting language.

In one embodiment, end-user browser 280 transmits the request for browser engine 290 to rules system 200. In response, rules system 200 transmits browser engine 290 to end-user browser 280. In another embodiment, end-user browser 280 may transmit the request for browser engine 290 to website 260, and may receive browser engine 290 from website 260. In yet another embodiment, browser engine 290 may transmit the request for browser engine 290 to an edge cache server, and receive browser engine 290 from the edge cache server as is described below in greater detail in relation to FIG. 3.

In operation, end-user browser 280 may be configured to execute the executable code contained within browser engine 290. When the executable code requires data from rules system 200, browser engine 290 can transmit a request to rules server 250 of rules system 200. For example, the executable code can require data from rules system 200 when the executable code is required to apply one or more rules to control an operation of webpage 270, such as controlling a display of content within webpage 270. In certain embodiments, the request transmitted by browser engine 290 can include a request attribute. In one embodiment, the request attribute is a URL attribute. In other embodiments, the request transmitted by browser engine 290 can include an identifier that uniquely identifies website 260. In one embodiment, the identifier is an account number associated with website 260.

Rules server 250 receives the request transmitted by browser engine 290. Rules server 250 subsequently selects one or more rule objects 241.1-241.N from cache 240 based on the received request. In one embodiment, rules server 250 selects rule objects 241.1-241.N based on a request attribute included within the received request. Here, rules server 250 selects each rule script associated with a request attribute that matches the request attribute included within the received request. In an alternate embodiment, rules server 250 selects rule objects 241.1-241.N based on an identifier included within the received request. In this instance, rules server 250 selects each rule object associated with an identifier that matches the identifier included within the received request. In another embodiment, rules server 250 selects one or more rule objects 241.1-241.N based on a combination of a request attribute and an identifier included within the received request.

Subsequently, rules server 250 executes the selected rule objects 241.1-241.N. The execution of the selected rule objects 241.1-241.N involves the execution of the executable code that is stored within cache 240. If the executable code is of a compiled language, rules server 250 can create an instance of a compiled class that corresponds to each rule script of the selected one or more rule scripts.

The execution of the selected one or more rule scripts generates data. The data can be utilized by browser engine 290 to control an operation of webpage 270, such as controlling a display of content within webpage 270. For example, the data can include unevaluated conditions, evaluated conditions, and actions that correspond to either an unevaluated condition or an evaluated condition. The data can also include state information (i.e., information about a state of rules server 250). For each rule contained within each rule script, rules server 250 can evaluate as many conditions as possible within rules server 250, so that a size of the generated data is as small as possible. More specifically, in circumstances where rules server 250 can evaluate a condition of a rule and determine an action based on the evaluated condition, rules server 250 can generate data that includes an evaluated condition and a corresponding action, as opposed to generating all possible actions associated with the rule. However, in circumstances when rules server 250 cannot evaluate a condition of a rule, and the condition is required to be evaluated by browser engine 290, rules server 250 can generate data that includes an unevaluated condition and all possible actions associated with the rule. Thus, by evaluating as many conditions as possible within rules server 250, a number of actions that are required to be generated can be reduced, which reduces an overall size of the data that is generated from the execution of the selected one or more rule scripts.

Once the data has been generated, rules server 250 transmits the data to browser engine 290. In one embodiment, rules server 250 transmits the data by transmitting an XML document to browser engine 290 that includes the data. In another embodiment, rules server 250 transmits the data by transmitting one or more JavaScript Object Notation ("JSON") objects to browser engine 290 that includes the data. According to the embodiment, the data does not include executable code, and thus, rules server 250 does not transmit any executable code to browser engine 290, in response to a request from browser engine 290. Instead, the only executable code that rules server 250 transmits to end-user browser 280 is browser engine 290. The absence of executable code within the data transmitted by rules server 250 to browser engine 290 can significantly reduce the size of the data that is transmitted. This can significantly reduce an overall processing time, and can increase overall performance.

In accordance with the embodiment, browser engine 290 utilizes the data received from rules server 250 to control an operation of webpage 270. In one example embodiment, browser engine 290 utilizes the data received from rules server 250 to control a display of content within webpage 270. For example, browser engine 290 utilizes the received data to display a web-based communication link, such as a click-to-call or click-to-chat communication link, within webpage 270. According to the example, in a web-based communication, a user can click an object (such as a button, image, text, or other type of icon) displayed within webpage 270 to request an immediate connection with an individual, such as an agent. When the web-based communication is a click-to-call communication, the immediate connection may be a telephone connection. When the web-based communication is a click-to-chat communication, the immediate connection may be a web-based chat session.

In one embodiment, rules server 250 uses a stateful session to persist a user state for a current session in a memory of rules server 250. The user state can include such data as one or more webpages visited by the user, and one or more sessions conducted by the user. The user state can be retrieved for each subsequent request and thus, the user state does not need to be rebuilt for each request. Furthermore, because the user state for the current session is persisted in the memory of rules server 250, rules server 250 is not required to persist the user state in one or more cookies stored within end-user browser 280. As rules objects 241.1-241.N are not stored within the sessions of rule server 250, but instead stored within cache 240, the memory management for rule server 250 is greatly improved as a result.

Rules server 250 can utilize load balancing to ensure requests from end-user browser 280 are transmitted to rules server 250. The user state can be retrieved from the memory of rules server 250 when a request from end-user browser 280 is received. Persisting the user state within the memory of rules server 250 can increase an overall performance of rules system 200, as less processing time is required to rebuild a user state. Furthermore, persisting the user state within the memory of rules server 250 can increase overall security, as the user state does not need to be transmitted to end-user browser 280 to be stored in one or more cookies. Finally, by storing rules objects 241.1-241.N separately within cache 240, the stateful session on rules server 250 may be limited to user state data. Thus, a larger user state can be persisted, which results in more data about the user being persisted.

Figure 3:
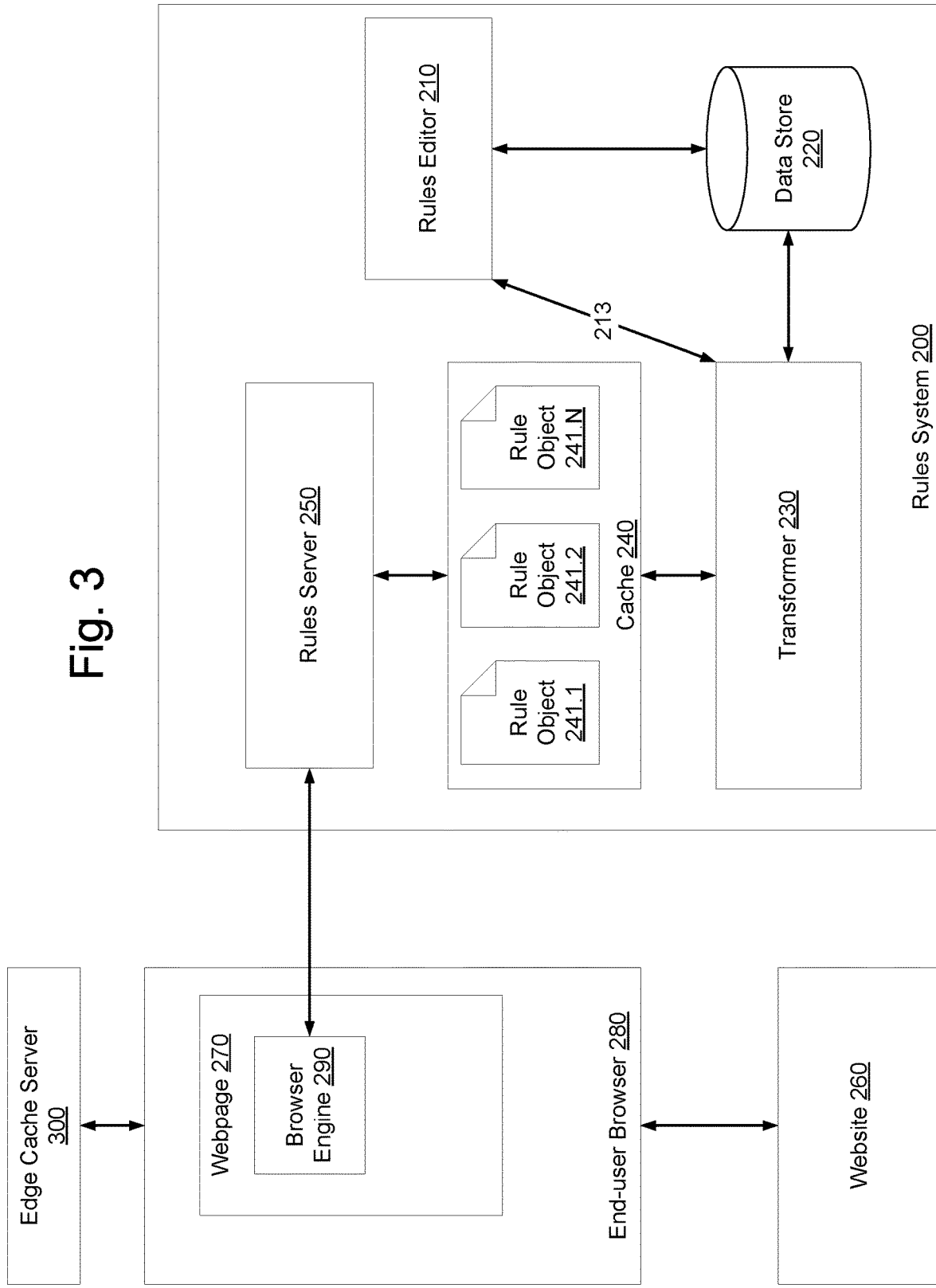
FIG. 3 illustrates a block diagram of a website operatively coupled to a rules system according to another example embodiment of the invention.

FIG. 3 illustrates a block diagram of a website operatively coupled to rules system 200 according to another example embodiment of the invention. The illustrated embodiment of FIG. 3 is similar to the illustrated embodiment of FIG. 2, and similar components that are described in relation to FIG. 2 are not described again in relation to FIG. 3. According to the embodiment, end-user browser 280 transmits the request for browser engine 290 to edge cache server 300, rather than rules server 250. Furthermore, end-user browser 280 receives browser engine 290 from edge cache server 300 rather than rules server 250. An edge cache server, such as edge cache server 300, is a server configured to store a cached copy of one or more webpages, where a cached copy of a webpage is a copy of a webpage that is created and stored when the original webpage is first retrieved. This reduces the processing time for subsequent retrievals of the webpage. In one embodiment, edge cache server 300 can be an Akamai® edge cache server. By utilizing edge cache server 300, which can be located in a very close proximity to end-user browser 280, browser engine 290 can be transmitted to end-user browser 280 very rapidly.

Figure 4:
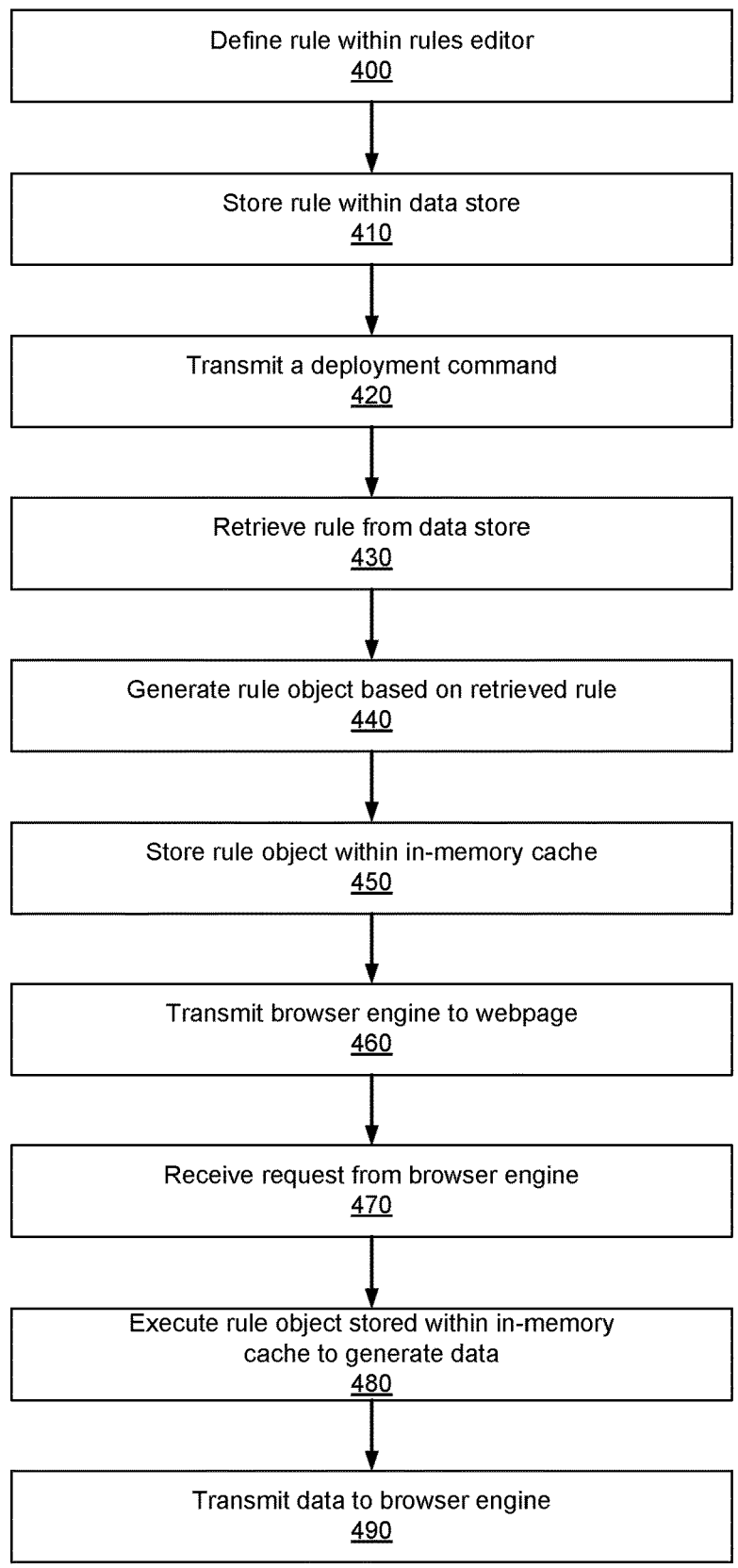
FIG. 4 illustrates a flow diagram of a rule script execution module according to an example embodiment of the invention.

FIG. 4 illustrates a flow diagram of a rule script execution module according to an example embodiment of the invention. In one embodiment, the functionality of the flow diagram of FIG. 4, as well as the functionality of the flow diagram of FIG. 5, described below, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 400, a rule is defined within a rules editor (e.g., rules editor 210). In one embodiment, the defining of the rule can include creating the rule within the rules editor. In another embodiment, the defining of the rule can include modifying the rule within the rules editor. The rules editor can display a user interface to a user within a web browser, and a user can interface with the rules editor using the user interface of the web browser to define a rule. The defining of the rule can include defining at least one condition and at least one related action for the rule. In one embodiment, an action for the rule can control a display of content within a webpage of a web site.

At 410, the rule is stored within a data store. In one embodiment, the rule is stored as part of a rule set that is also stored within the data store. In one embodiment, the data store can be a database, where the rule is stored as a record within the database. In another embodiment, the data store can be a file, where the rule is stored within the file. In yet another embodiment, the data store can be a file system that includes a plurality of files, where the rule is stored within a file of the plurality of files.

At 420, a deployment command is transmitted. The deployment command includes a command to deploy one or more rules stored within the data store. In one embodiment, the deployment command can also include a filter that can be applied to the one or more rules stored within the data store. As an example, the filter can indicate that only the rules associated with a website are to be deployed.

At 430, a rule is retrieved from the data store. In an embodiment where a deployment command includes a filter, the filter can be applied to the data store to only retrieve a rule that satisfies the filter.

At 440, a rule object is generated based on the rule that is retrieved from the data store. In one embodiment, a rule object is created by generating executable code for the rule that is retrieved from the data store and storing the executable code within a rule script. In one embodiment, a rule object that is generated corresponds to a website. The website is defined using a request attribute, where the defined request attribute is stored within the data store. In one embodiment, the executable code is of a compiled language. In another embodiment, the executable code is of a scripting language. Furthermore, in one embodiment, the rule script is a synthetic variable rule script, and the executable code is of a synthetic variable scripting language.

At 450, the rule script is stored within an in-memory cache. The storage of rule objects within the cache enables rule publication in real-time or substantially real-time. As a result, the rules server does not require notification of a publish event. Instead, the rules server may retrieve the latest rule objects from the data cache.

At 460, a browser engine is transmitted to a webpage. In one embodiment, the browser engine is a static scripting language file that contains executable code that can be executed by an end-user browser. The executable code contained within the browser engine can control an operation of the webpage, such as controlling a display of content within the webpage. In an alternate embodiment, an edge cache server can transmit the browser engine to the webpage.

At 470, a request is received from the browser engine. In one embodiment, the request is a request to receive data corresponding to a rule so that the rule can be applied to control an operation of the webpage, such as controlling a display of content within the webpage. Also in one embodiment, the request can include data. In one embodiment where the request includes data, the request includes a request attribute. In another embodiment where the request includes data, the request includes an identifier that uniquely identifies a website that the webpage is associated with.

At 480, the rule object is executed to generate data. The rule object is executed in response to the received request. In one embodiment, the execution of the rule script involves the execution of the executable code stored within the memory of the rules server.

At 490, the data is transmitted to the browser engine. In one embodiment, the data is transmitted by transmitting a XML document to the browser engine, where the XML document includes the data. In an alternate embodiment the data is transmitted by transmitting one or more JSON objects to the browser engine, where the one or more JSON objects include the data. According to the embodiment, the data does not include any executable code.

Figure 5:
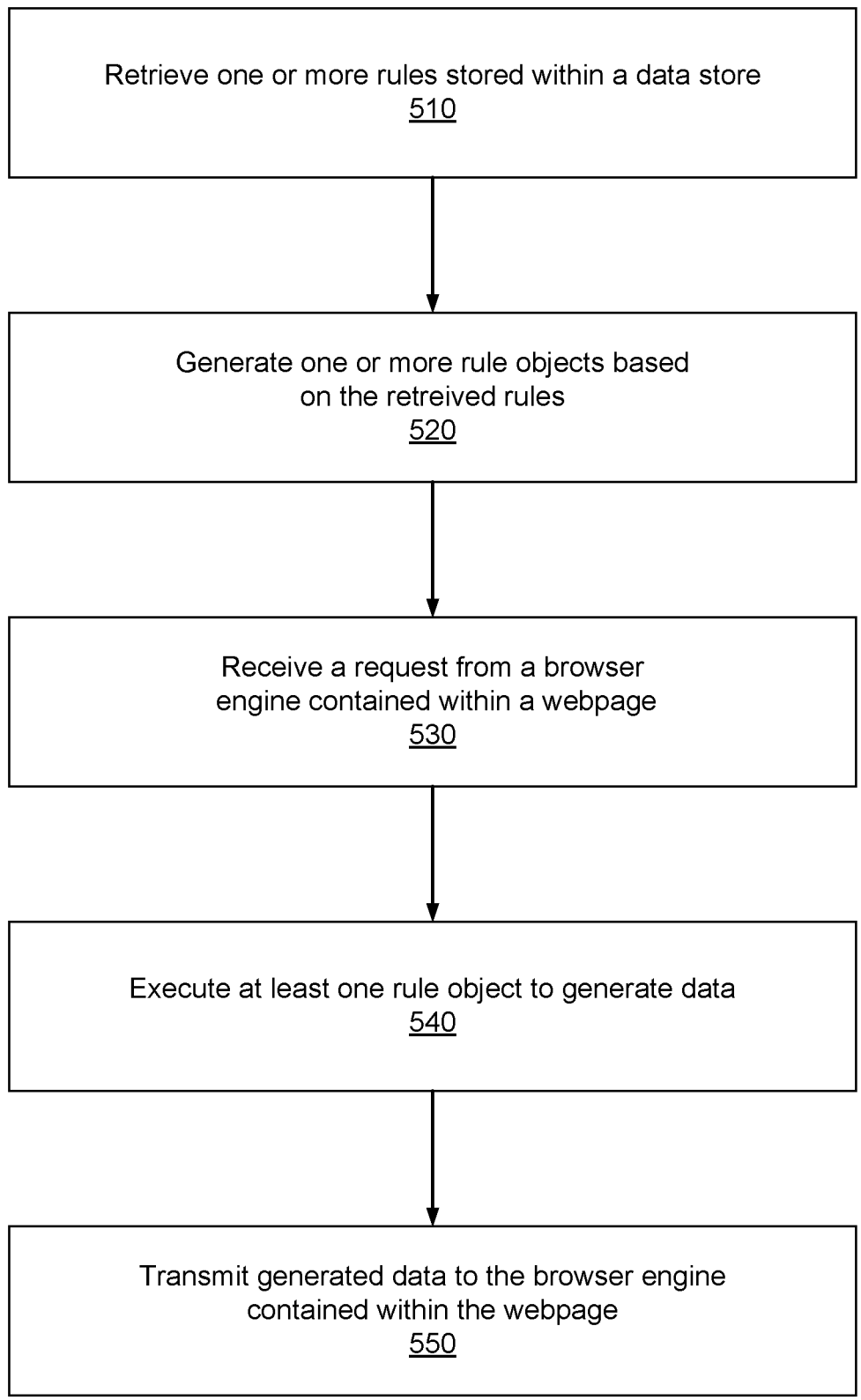
FIG. 5 illustrates another flow diagram of the functionality of a rule script execution module according to an example embodiment of the invention.

FIG. 5 illustrates another flow diagram of the functionality of a rule script execution module according to an example embodiment of the invention. At 510, one or more rules that are stored within a data store are retrieved. Each rule includes one or more conditions and one or more actions, where each action includes an instruction to display content within the webpage. In one embodiment, a filter can be applied to the data store to only retrieve one or more rules that satisfy the filter.

At 520, one or more rule objects are generated based on the retrieved rules. In one embodiment, each rule script includes executable code. In an embodiment, the executable code is of a compiled language. In another embodiment, the executable code is of a scripting language. Furthermore, in one embodiment, each rule script is a synthetic variable rule script, and the executable code is of a synthetic variable scripting language. The generated rule objects may be stored within an in-memory cache.

At 530, a request is received from a browser engine contained within a webpage. In one embodiment, the request is a request to retrieve data corresponding to a rule so that the rule can be applied to control an operation of the webpage, such as controlling a display of content within the webpage. The request can include data. In one embodiment where the request includes data, the request includes a request attribute. In another embodiment where the request includes data, the request includes an identifier that uniquely identifies a website that the webpage is associated with.

At 540, at least one rule object is executed to generate data. The at least one rule script is executed in response to the received request. In one embodiment, the execution of the at least one rule script involves the execution of the executable code of the at least one rule script.

At 550, the data generated by the at least one rule object is transmitted to the browser engine contained within the webpage. In one embodiment, the data is transmitted by transmitting a XML document to the browser engine, where the XML document includes the data. In an alternate embodiment the data is transmitted by transmitting one or more JSON objects to the browser engine, where the one or more JSON objects include the data. According to the embodiment, the data does not include any executable code.

Thus, the rules system described herein can store one or more rules within a data store, and can deploy one or more rules as one or more rule objects into an in memory cache, so that the one or more rule objects are loaded by a rules server from an in-memory cache. The rules system can then receive requests from a browser engine contained within a web page and retrieve quickly the associated rules objects quickly from an in-memory cache then execute the one or more rule scripts loaded by the rules server to generate data. The rules system can then transmit the generated data to the browser engine contained within the web page.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method for manipulating dynamically rendered content that is deployed on a webpage, the method comprising:

defining and storing a plurality of rules in a data store, wherein each rule includes a condition and an action, and wherein each action includes an instruction to render content within the webpage;

retrieving the plurality of rules from the data store;

generating by a transformer a plurality of rule objects based on the plurality of rules retrieved from the data store, wherein each rule object comprises executable code that is stored within a rule script and each rule object corresponds to a different website;

storing the generated rule objects within an in-memory device disposed between a rules server and a transformation server and external to the rules server;

receiving at the rules server a request for data from a browser engine contained within the webpage;

selecting, by the rules server, on demand in response to the request, a latest version of the corresponding rule object from the in-memory device without directly accessing the data store, wherein the browser engine comprises executable code that is executed by a browser that renders the webpage, and the rules server using a Hypertext Transfer Protocol (HTTP) request to select the rule objects directly from the in-memory device;

storing, on the rules server, a stateful session to persist a user state for a current session, the stateful session stored on the rules server limited to user state data and not including the rule objects;

executing by the rules server the selected latest version of the rule object to generate the requested data without directly accessing the data store, the executing comprising executing executable code that is stored on the in-memory device and corresponds to the selected rules object, wherein the executable code comprises a compiled language and the executing creates an instance of a compiled class that corresponds to a corresponding rule script; and transmitting the requested data generated by executing the rule object to the browser engine contained within the webpage causing the data to be deployed on the webpage.

2. The method according to claim 1, wherein the latest version of the rule objects are maintained within the in-memory device and the storing the generated rule objects within the in-memory device enables a publication of the rules in real-time or near real-time.

3. The method according to claim 1, wherein the rule objects are not held by the rules server and the rules server does not require notification of a publish event, the method further comprising transmitting the browser engine to the browser.

4. The method according to claim 1, wherein the in-memory device includes an in-memory database.

5. The method according to claim 1, wherein the in-memory device includes an in-memory data grid.

6. The method according to claim 1, wherein the executable does not comprise executing code stored by the rules server.

7. The method according to claim 1, wherein the transmitting the data further comprises transmitting one or more JavaScript® object notation objects that comprise the data to the browser engine.

8. A non-transitory computer readable storage medium storing one or more programs configured to be executed by a processor to manipulate dynamically rendered content that is deployed on a webpage, the one or more programs comprising instructions for:
   defining and storing a plurality of rules in a data store, wherein each rule includes a condition and an action, and wherein each action includes an instruction to render content within the webpage;
   retrieving the plurality of rules from the data store;
   generating by a transformer a plurality of rule objects based on the plurality of rules retrieved from the data store, wherein each rule object comprises executable code that is stored within a rule script and each rule object corresponds to a different website;
   storing the generated rule objects within an in-memory device disposed between a rules server and a transformation server and external to the rules server;
   receiving at the rules server a request for data from a browser engine contained within the webpage;
   selecting, by the rules server, on demand in response to the request, a latest version of the corresponding rule object from the in-memory device without directly accessing the data store, wherein the browser engine comprises executable code that is executed by a browser that renders the webpage, and the rules server using a Hypertext Transfer Protocol (HTTP) request to select the rule objects directly from the in-memory device;
   storing, on the rules server, a stateful session to persist a user state for a current session, the stateful session stored on the rules server limited to user state data and not including the rule objects;
   executing by the rules server the selected latest version of the rule object to generate the requested data without directly accessing the data store, the executing comprising executing executable code that is stored on the in-memory device and corresponds to the selected rules object, wherein the executable code comprises a compiled language and the executing creates an instance of a compiled class that corresponds to a corresponding rule script; and
   transmitting the requested data generated by executing the rule object to the browser engine contained within the webpage causing the data to be deployed on the webpage.

9. The non-transitory computer readable storage medium according to claim 8, wherein the latest version of the rule objects are maintained within the in-memory device and the storing the generated rule objects within the in-memory device enables a publication of the rules in real-time or near real-time.

10. The non-transitory computer readable storage medium according to claim 8, wherein the rule objects are not held by the rules server and the rules server does not require notification of a publish event, further comprising transmitting the browser engine to the webpage.

11. The non-transitory computer readable storage medium according to claim 8, wherein the in-memory device includes an in-memory database.

12. The non-transitory computer readable storage medium according to claim 8, wherein the in-memory device includes an in-memory data grid.

13. The non-transitory computer readable storage medium according to claim 8, wherein the executable does not comprise executing code stored by the rules server.

14. The non-transitory computer readable storage medium according to claim 8, wherein the transmitting the data further comprises transmitting one or more JavaScript® object notation objects that comprise the data to the browser engine.

15. A device that manipulates dynamically rendered content that is deployed on a webpage comprising:
   a processor; and
   memory storing one or more programs for execution by the processor, the one or more programs including instructions for:
      defining and storing a plurality of rules in a data store, wherein each rule includes a condition and an action, and wherein each action includes an instruction to render content within the webpage;
      retrieving the plurality of rules from the data store;
      generating by a transformer a plurality of rule objects based on the plurality of rules retrieved from the data store, wherein each rule object comprises executable code that is stored within a rule script and each rule object corresponds to a different website;
      storing the generated rule objects within an in-memory device disposed between a rules server and a transformation server and external to the rules server;
      receiving at the rules server a request for data from a browser engine contained within the webpage;
      selecting, by the rules server, on demand in response to the request, a latest version of the corresponding rule object from the in-memory device without directly accessing the data store, wherein the browser engine comprises executable code that is executed by a browser that renders the webpage, and the rules server using a Hypertext Transfer Protocol (HTTP) request to select the rule objects directly from the in-memory device;
      storing, on the rules server, a stateful session to persist a user state for a current session, the stateful session stored on the rules server limited to user state data and not including the rule objects;
      executing by the rules server the selected latest version of the rule object to generate the requested data without directly accessing the data store, the executing comprising executing executable code that is stored on the in-memory device and corresponds to the selected rules object, wherein the executable code comprises a compiled language and the executing creates an instance of a compiled class that corresponds to a corresponding rule script; and transmitting the requested data generated by executing the rule object to the browser engine contained within the webpage causing the data to be deployed on the webpage.

16. The device according to claim 15, wherein the latest version of the rule objects are maintained within the in-memory device and the storing the generated rule objects within the in-memory device enables a publication of the rules in real-time or near real-time.

17. The device according to claim 15, wherein the rule objects are not held by the rules server and the rules server does not require notification of a publish event, further comprising transmitting the browser engine to the webpage.

18. The device according to claim 15, wherein the in-memory device includes an in-memory database.

19. The device according to claim 15, wherein the in-memory device includes an in-memory data grid.

20. The device according to claim 15, wherein the executable does not comprise executing code stored by the rules server.

21. The device according to claim 15, wherein the transmitting the data further comprises transmitting one or more JavaScript® object notation objects that comprise the data to the browser engine.

* * * * *